Dec. 22, 1970     F. E. BARSTOW ET AL     3,548,411
RETRACTABLE GOGGLES FOR HELMET
Filed Feb. 26, 1969     2 Sheets-Sheet 2
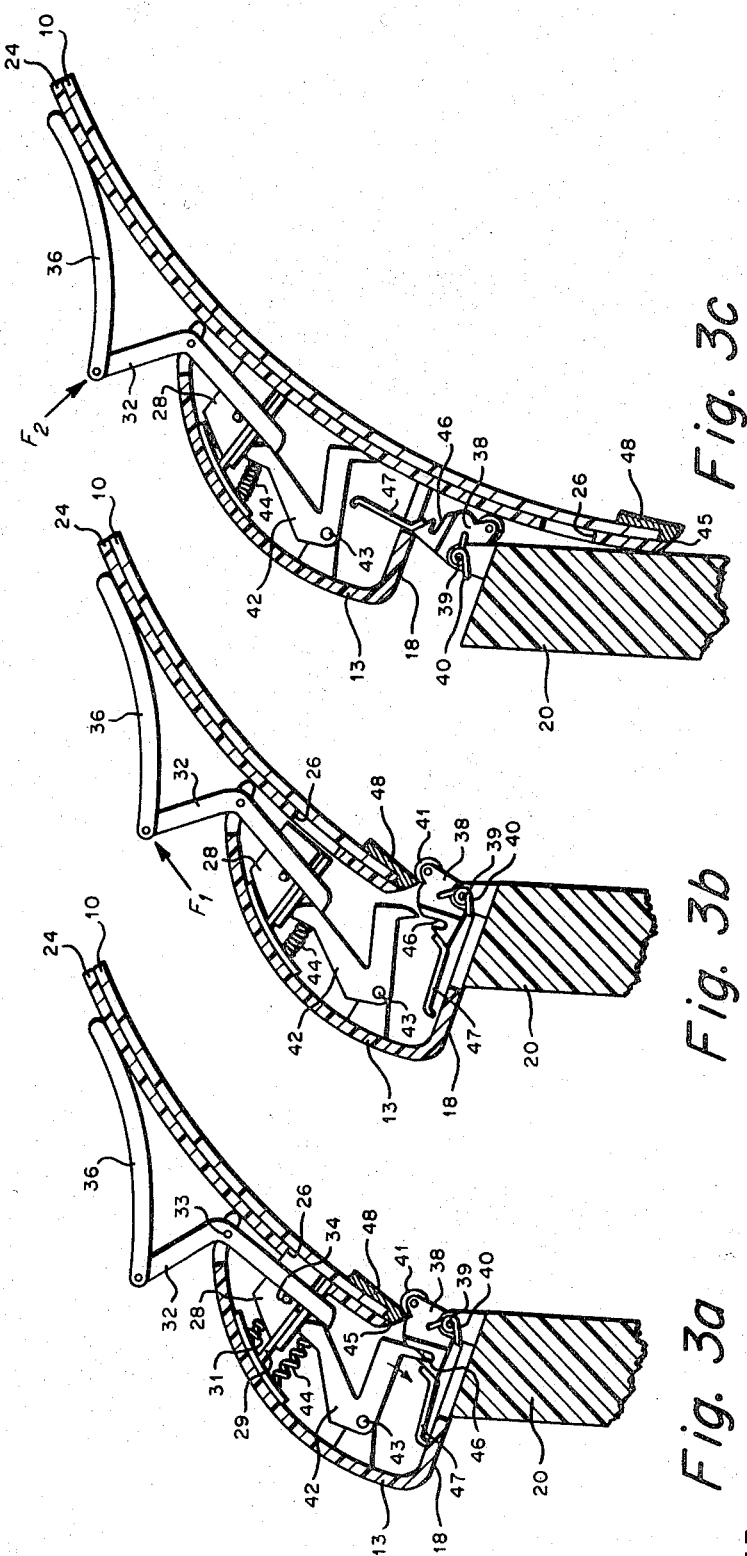
INVENTORS
FREDERICK E. BARSTOW
PAUL LARSON
UDO W. SALOMON
BY
ATTORNEY

United States Patent Office 3,548,411
Patented Dec. 22, 1970

3,548,411
RETRACTABLE GOGGLES FOR HELMET
Frederick E. Barstow, Needham, and Paul Larson and
Udo W. Salomon, Peabody, Mass., assignors, by mesne
assignments, to the United States of America as represented by the Secretary of the Navy
Filed Feb. 26, 1969, Ser. No. 802,524
Int. Cl. A42b 3/00
U.S. Cl. 2—6                                6 Claims

ABSTRACT OF THE DISCLOSURE

Flashblindness-protective goggles articulated on a protective helmet and retractable from a lowered operational position in front of and close to the eyes of the wearer to a raised non-operational position on the front of the helmet out of his line of vision. A pair of photochromic lenses are mounted in a dihedral frame which is pivotally attached at either side to a wrap-around canopy. The canopy, in turn, is pivotally attached at its side extremities to either side of the helmet at points just above the earphone emplacements. A center guide and lock mechanism enables free movement of the goggles over the front of the helmet between the two positions, and provides positive positioning at either position.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to protective helmets such as worn by aircraft pilots and the like, and more particularly to flashblindness-protective retractable goggles therefor having a relatively large field of view.

A protective head gear or so-called crash helmet such as worn by pilots of modern, high-performance aircraft is usually provided with a transparent wrap-around eyeshield, either clear or tinted, for protecting the eyes from the glare of sunlight, and from high velocity forces caused by wind or moving objects. The eyeshield is retractable from in front of the eyes to a position on the front of the helmet. The peripheral dimensions of the helmet dictate that the position of the eyeshield when in front of the eyes be considerably displaced from the eyes in order that the eyeshield will clear the front of the helmet when retracted. The entire eyeshield must be transparent in order to maintain a wide viewing angle.

Recent developments in photochromic goggles for flashblindness protection, such as disclosed in U.S. Pat. 3,152,215 for "Flashblindness Protective Apparatus" by Barstow et al. issued Oct. 6, 1964, have lens systems of greatly reduced areas for light transmission. The displacement of the goggles in front of the eyes required to clear the front of the helmet severely reduces the field of view of the wearer. Dictated by the state-of-the-art limitations on sizes of photochromic lenses, it is necessary for the goggles to be positioned as close to the eyes as possible in order to obtain the maximum possible viewing angle, while also permitting the goggles to clear the front of the helmet for retraction to the raised position.

SUMMARY OF THE INVENTION

Accordingly, it is the general purpose of the present invention to provide a protective helmet and retractable goggle system which, in the lowered position, is as close as possible to the eyes thus insuring a large field of view to the pilot, and which can be quickly and easily retracted by a singular finger tip action to the raised position in front of the helmet without jamming or snagging on the brim of the helmet.

This is accomplished according to the invention by goggles having the lens frame articulated within a wrap-around support which is pivotally connected at its ends to either side of the helmet. A spring latch and follower pivotally connected to the support and lens frame, respectively, positively seat the frame in the support. A detent plunger slidably connected to the support positively positions the support on the helmet at either the lowered or raised position. A single actuating lever operates both the spring latch and plunger, and the force applied thereto also urges the goggles toward the raised position.

BRIEF DESCRIPTION OF THE DRAWING

FIG. 3a represents a fragmentary cross-sectional view taken along the line 3—3 of FIG. 2 of a guide and lock mechanism according to the invention with the goggles locked in the lowered position;

FIG. 3b represents a cross-sectional view like FIG. 3a except with the goggles unlocked in the lowered position; and FIG. 3c represents a cross-sectional view like FIG. 3a except with the goggles unlocked in a position intermediate of the lowered and raised positions.

DESCRIPTION OF THE PREFERRED EMBODIMENT

Figure 1:
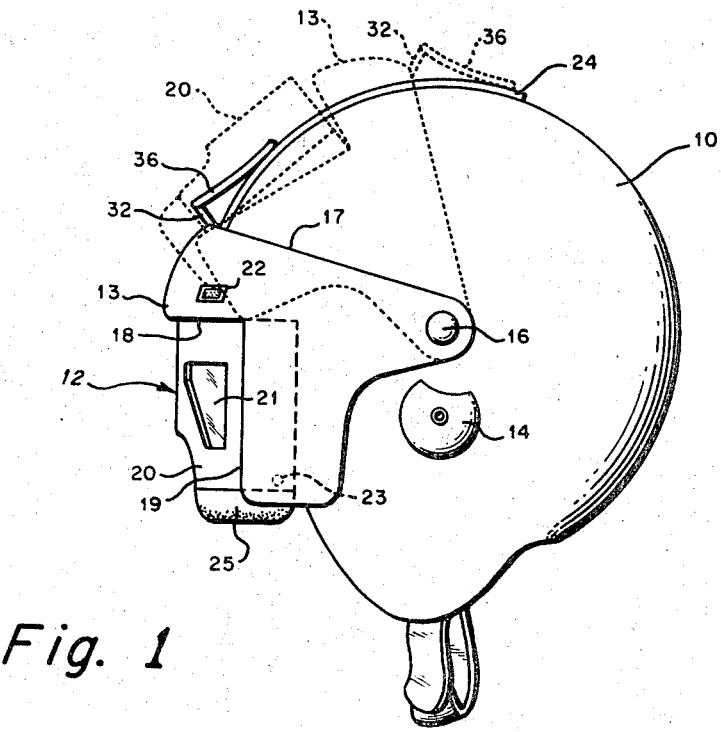
FIG. 1 represents a side view of a helmet with goggles according to the invention lowered in an operational position, and additionally illustrates in dotted outline the goggles raised in a non-operational position.
Figure 2:
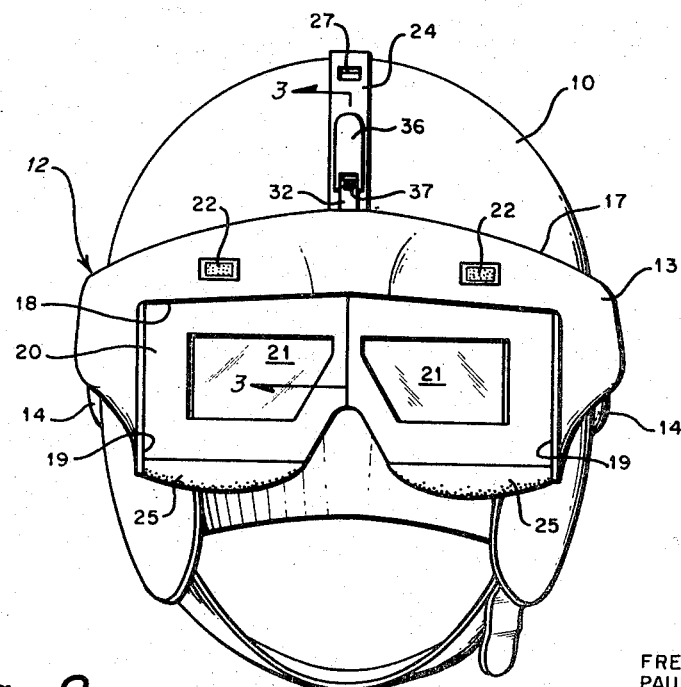
FIG. 2 represents a front view of the helmet and goggles of FIG. 1.

Referring to FIGS. 1 and 2, there is shown a protective helmet 10 which may be of the conventional construction except it includes photochromic goggles indicated generally by the numeral 12 for protection of the wearer's eyes against flashblindness or retinal burns caused by intense flashes of light emitted by nuclear detonations or the like. The goggles 12 include a wrap-around canopy 13 terminating in downwardly extending side panels which are pivotally connected at either side of the helmet 10 just above earphone emplacements 14 by shafts 16, only the left shaft being shown in FIG. 1. The upper edge 17 of the canopy 13 generally conforms to the curvature of the helmet with just enough clearance to enable its free movement between the lowered position where the edge 17 is adjacent to the front brim of the helmet and the raised position where it is adjacent to the top of the helmet. The lower edge 18 between the two canopy side panels and the opposed surfaces 19 of the canopy side panels of the canopy 13 are formed to receive a dihedral lens frame 20 with the adjacent surfaces of the canopy 13 and frame 20 being contiguous to seal off light. The frame 20 is pivotally connected at either lower and outer extremity to the canopy side panels by pins 23, only the left pin being shown in FIG. 1, so that the top of the frame 20 can tilt forwardly relative to the canopy 13 in the manner shown in dotted outline. A resilient pad 25 fixed to the bottom edge of the frame 20 functions as both a cushion and light seal between the goggles 12 and the oxygen mask, not shown.

The frame 20 contains two planar lenses 21, each lens comprising a thin layer of photochromic solution confined between two optically ground and polished quartz wedges. Light-sensitive detectors 22 pick up "early" light from an intense light source and trigger Xenon flash tubes which bombard the photochromic solution with ultraviolet energy. This causes a change in the solution, and it becomes opaque for a desired length of time, e.g., two seconds, before automatically clearing. A more detailed explanation of such photochromic goggles is disclosed in U.S. Pat. 3,152,215 supra.

A guide and lock mechanism, now to be described with further reference to FIGS. 3a, 3b and 3c, establishes mechanical cooperation between the helmet 10, canopy 13 and frame 20 for locking the goggles 12 in the lowered operational position, for unlocking and pivoting the goggles 12 over the front of the helmet to the raised nonoperational position at the top of the helmet, and for locking the goggles 12 in the raised position.

Secured on the outside of the helmet 10 midway between its sides an elongated guide track 24 extends vertically downward along its length from a point near the top to the front brim. The track 24 includes two openings 26 (FIG. 3a) and 27 (FIG. 2) near either end for registering with a keeper 28 when the goggles 12 are in the lowered and raised positions, respectively. The keeper 28 is restricted to one degree of motion normal to the surface of the track 24 by a keeper guide 29 fixed to the canopy 13 and it is urged into registration with the track openings 26 and 27 by a compression keeper spring 31 which is operatively connected between the canopy 13 and keeper 28. The keeper 28 is retracted from the openings by manually opposing the spring force through a bellcrank actuator 32 pivotally connected by pin 33 near the top of the canopy 13. One arm of the actuator 32 is bifurcated about keeper 28 for engaging lateral bosses 34 thereof. The other arm extends out from the top of the canopy 13 and is formed to be manually operated by the wearer's fingers. Thus, an upward force applied to the exposed arm in the direction illustrated in FIG. 3b causes the actuator 32 to rotate clockwise and retract keeper 28 from opening 26.

An elongated deflector 36 is pivotally connected at one end to the outer end of the exposed actuator arm, the other end is urged against the track 24 in sliding relation by a torsion spring 37 (FIG. 2) which is operatively connected at the actuator-deflector pivotal connection. The deflector 36 prevents snagging or fouling of the windscreen which the pilot must pull over his helmet and face before ejecting from the aircraft.

In the lowered operational position of FIG. 3a, the frame 20 is locked against the lower edge 18 of the canopy 13 by a latch 38 pivotally connected midway to the frame between the sides at pin 39. A torsion spring 40 located at pin 39 urges the counterclockwise rotation of latch 38 toward a locking position. A roller 41, rotatably connected to a distal end of the latch 38, establishes rolling contact with the contiguous exposed ends of the guide track 24 and a flanged backing plate 48 which is secured to the front brim of the helmet 10 behind the track 24 to provide additional strength and which functions as a ramp for the roller 41 during movement onto and from the track 24. The roller 41 is maintained in rolling contact by a bell crank sear 42 pivotally connected to the canopy 13 by pin 43. A compression spring 44, operatively positioned between the canopy 13 and one arm of the bell crank sear 42, urges the other arm clockwise, as shown by the arrow in FIG. 3a, to be cammed into a groove 46 of the latch 38 thereby preventing rotation thereof in either direction about pin 39. The bell crank actuator 32 which engages bosses 34 also contacts the one arm of the sear 42 to oppose the force of spring 44. That is, clockwise movement of actuator 32 causes counterclockwise movement of sear 42, against the force of spring 44, to disengage latch 38. It should thus be apparent that the latch 38 secures the frame 20, when in the lowered operational position, as close as possible to the wearer's eyes in order to afford the maximum viewing angle through the lenses 21.

FIG. 3b fragmentarily illustrates the goggles 12 in the unlocked and lowered position. That is, a single manual force $F_1$, as shown by the arrow, is being applied to the exposed arm of the actuator 32 sufficient to cause the keeper 28 to be retracted from guide track opening 26 and sear 42 to be retracted from latch 38. Further application of force $F_1$ will raise the goggles 12 and cause latch 38 to rotate clockwise. The latch 38 and confronting surfaces 45 of the guide track 24 and backing plate 48 are oppositely formed to afford rolling contact on the track as the latch 38 rotates clockwise. Latch rotation causes the frame 20 to tilt outwardly about shafts 23 sufficiently to clear the front brim of the helmet as the goggles move upwardly.

As illustrated in FIG. 3c, further upward movement of the goggles introduces rolling contact between the roller 41 and the guide track 24. A latch stop 47 fixed to the latch 38, when positioned to bear against the edge of canopy 13, opposes the torsioned spring 40 at pin 39, thereby limiting the counterclockwise motion of the latch 38 and ensuring that rolling contact is maintained during further upward movement of the goggles 12.

The goggles 12 have reached their upper limit when the keeper 28 registers with the guide track opening 27. Removal of the manually applied force $F_1$ on actuator 32 permits the keeper 28 to move into opening 27 and positively retain the goggles in the upward position.

To lower the goggles from the raised position, a relatively small force $F_2$ is applied to the actuator 32 sufficient to retract the keeper 28 from opening 27. No further force is necessary as the weight of the goggles will cause them to lower. Some force may be used to restrain the motion. When keeper 28 approaches and registers with opening 26, the latch 38 will rotate counterclockwise and again engage the backing plate 48 behind the brim of the helmet 10 and will be engaged by the lower arm of the sear 42 as illustrated in FIG. 3a. The frame 20 is thereby pivoted back into the locked relation with the canopy 13 and the helmet 10.

Some of the many advantages of the invention should now be readily apparent. For example, goggles having relatively small viewing areas can be placed close to the wearer's eyes to afford a maximum viewing angle. The goggles can be quickly moved from a lowered operational position to a raised nonoperational position and vice versa with essentially one manual action of one hand. The guide and lock mechanism is of relative simple construction and high reliability, and the balanced symmetrical design ensures against jamming.

Obviously many modifications and variations of the present invention are possible in the light of the above teachings. It is therefore to be understood that within the scope of the appended claims the invention may be practiced otherwise than as specifically described.

What is claimed is:

1. Protective apparatus for a wearer comprising:
   a helmet having a front brim offset from wearer's forehead;
   goggles including a wrap-around canopy pivotally connected at a fixed location to the sides of said helmet for movement between an operational position in front of the eyes and a non-operational position near the top of said helmet, a lens frame, and means on said wrap-around canopy pivotally supporting said lens frame within said canopy for selective movement toward and away from the face of the wearer; and
   guide and lock mechanism operatively connected between said goggles and said helmet for contiguously locking said lens frame in said canopy in close proximity to the wearer's eyes when in the operational position, and for pivoting said lens frame outwardly over the front brim of said helmet when said goggles are moved to the non-operational position.

2. Apparatus according to claim 1 wherein:
   said helmet further includes a vertically extending guide track on the front of said helmet with an opening formed therein at either end; and
   said mechanism further includes a keeper slidably connected to said canopy for selectively registering with one of said openings when said goggles are in the operational and non-operational positions, a first force-exerter positioned between said canopy and said keeper for urging said keeper into said openings, and an actuator pivotally connected to said canopy for retracting said keeper from said one opening against the urging of said first force-exerter.

3. Apparatus according to claim 2 further comprising: deflector means pivotally connected at one end to said actuator and the other end urged against said guide track for deflecting surrounding objects away from said goggles.

4. Apparatus according to claim 3 wherein said mechanism further comprises:

latch means pivotally connected to said lens frame and having a distal end adjacent the inside surface of said helmet when said lens frame is locked in the operational position and adjacent the outside surface of said helmet when in the unlocked position, said latch means further including a sear groove formed therein;

a sear pivotally connected to said canopy and selectively engaging said groove when said latch means is in the locked position;

a second force exerter positioned between said canopy and said sear for urging said sear into said groove; and said actuator means operatively connected to said sear for urging said sear out of said groove against the force of said second force exerter.

5. Apparatus according to claim 4 wherein said latch means further comprises:

a roller for producing rolling contact between said latch means and said guide tract when said latch means is in the unlocked position.

6. Apparatus according to claim 5 wherein said latch means further comprises:

spring means normally urging said latch means to move toward a locking position; and stop means fixed to said latch means for contacting said canopy to limit movement of said latch means beyond said locking position.

References Cited

UNITED STATES PATENTS

| | | | |
|---|---|---|---|
| 2,867,812 | 1/1959 | Roth et al. | 2—6 |
| 3,162,862 | 12/1964 | Miller | 2—6 |
| 3,310,811 | 3/1967 | Iacono | 2—6 |
| 3,409,909 | 11/1968 | Scott et al. | 2—14 |

H. HAMPTON HUNTER, Primary Examiner